United States Patent [19]

Graves

[11] Patent Number: 4,585,826
[45] Date of Patent: Apr. 29, 1986

[54] NATURAL RUBBER CONTAINING COMPOSITIONS WITH INCREASED TEAR STRENGTH

[75] Inventor: Daniel F. Graves, Clinton, Ohio

[73] Assignee: The Firestone Tire & Rubber Company, Akron, Ohio

[21] Appl. No.: 695,651

[22] Filed: Jan. 28, 1985

[51] Int. Cl.$^4$ ............................ C08K 3/04; C08K 3/36
[52] U.S. Cl. .................................... 524/534; 524/445; 524/451; 524/493; 524/496; 524/521; 524/522; 524/533
[58] Field of Search ............... 524/533, 534, 521, 522, 524/451, 445, 493, 496

[56] References Cited

U.S. PATENT DOCUMENTS

| | | | |
|---|---|---|---|
| 3,837,904 | 9/1974 | Hill | 427/375 |
| 4,088,708 | 5/1978 | Rien | 525/113 |
| 4,204,984 | 5/1980 | Neubert | 428/392 |
| 4,287,928 | 9/1981 | Hallman | 152/346 |
| 4,303,715 | 12/1981 | Chang | 428/334 |
| 4,311,759 | 1/1982 | Glennon | 428/518 |
| 4,433,094 | 2/1984 | Ogawa et al. | 524/434 |
| 4,485,198 | 11/1984 | Hamed | 525/284 |

OTHER PUBLICATIONS

Derwent Abstract 84-021184/04, 12-10-83 (J58213042).

Primary Examiner—Herbert J. Lilling
Attorney, Agent, or Firm—Daniel N. Hall

[57] ABSTRACT

Including certain carboxy-terminated butadiene-acrylonitrile copolymers in natural rubber formulations increases their tear strength, and hardness properties.

13 Claims, No Drawings

NATURAL RUBBER CONTAINING COMPOSITIONS WITH INCREASED TEAR STRENGTH

TECHNICAL FIELD

This invention relates to increasing the tear strength of cured elastomeric compositions containing natural rubber.

It is especially useful in providing cured elastomeric compositions for use in making articles containing natural rubber that are subject to dynamic deformation, especially tear stress. These compositions are useful in manufacturing tank track pads (the rubber blocks glued to metal tank tracks), belt skims (the rubber sheets laminated with steel cord to provide the steel belt for a tire), and treads for tires for trucks and off-road vehicles.

BACKGROUND OF THE INVENTION

Conventionally, articles requiring high tear strength and tear resistance are fabricated of natural rubber (rather than synthetic rubber) with tear strength being increased further by increasing the amount of reinforcing filler or increasing the cross linking by utilizing more sulfur.

SUMMARY OF THE INVENTION

It has now been discovered that inclusion of selected amounts of particular liquid carboxy-terminated unsaturated butadiene-acrylonitrile copolymers (sometimes referred to hereinafter as CTBN) increases the tear strength of natural rubber containing compositions. Contrary to conventional alternatives, the composition of the invention allows the inclusion of preferred amounts of reinforcing filler and the use of normal cross-linking conditions without deleterious effect on tear strength and instead is characterized by increased tear strength compared to a natural rubber composition without the CTBN additive. Contrary to conventional alternatives, the composition of the invention allows the flexibility of including synthetic rubber in place of some of the natural rubber while maintaining the high tear strength normally associated with natural rubber compositions.

It has further been discovered that the inclusion of the selected amounts of the CTBN increases the hardness of cured compositions and reduces the viscosity (thus aiding processing) of uncured compositions.

Compositions herein are elastomeric compositions which are curable and comprise:
(a) 100 parts by weight polymer consisting of
 (i) from about 95 to about 25 parts by weight of natural rubber,
 (ii) from 0 to about 65 parts by weight of synthetic rubber,
 (iii) from about 5 to about 25 parts by weight of liquid carboxy-terminated butadiene-acrylonitrile copolymer having a functionality ranging from about 1.5 to about 2.5, an acrylonitrile content ranging from about 10% to about 40% by weight and a Brookfield viscosity at 27° C. ranging from about 50,000 to about 200,000 centipoise,
(b) from about 30 to about 120 parts by weight of reinforcing filler.

The aforementioned ingredients are used with a conventional curing system to provide a cured composition within the scope of the invention which exhibits the aforementioned very desirable attributes.

In certain embodiments of the invention, the aforementioned ingredients (a) and (b) can be kept apart from at least part of the curing system until just prior to curing. Therefore, a composition comprising (a) and (b) is one embodiment while the cured composition is another. The former can be sold as a separate item of commerce to be later combined with the curing system.

The term "phr" as used hereinafter refers to parts by weight per hundred parts by weight of polymer consisting of natural rubber, any synthetic rubber present and the CTBN.

DETAILED DESCRIPTION

The greatest tear strengths and resistances obtained when the only elastomer present (besides CTBN) is natural rubber rather than a blend of natural rubber with synthetic rubber. The term "natural rubber" is used herein to mean elastomeric substances obtained from trees and plants such as the well-known hevea and guayule rubbers.

However, very acceptable tear strengths can be obtained even when some of the natural rubber is replaced by synthetic rubber and thus blends of natural and synthetic rubber are also included within the scope of useful embodiments. The synthetic elastomer can be any of those normally blended with natural rubber, e.g. polybutadiene, polystyrene-butadiene, neoprene and EPDM elastomers. Compositions including styrene-butadiene rubber at a level of about 45 to about 65 phr weight of polymer are very useful herein.

Turning to the liquid CTBN ingredient, it normally is a liquid at ambient temperatures (say 5°–35° C.) and preferably utilized in an amount ranging from about 5 to about 15 phr. Preferably the CTBN has an acrylonitrile content ranging from about 15% to about 25% by weight and a Brookfield viscosity at 27° C. ranging from about 125,000 to about 175,000 centipose. Carboxy-terminated butadiene-acrylonitriles (CTBNs) for use herein are available commercially available such as those sold under the trademarks by the B. F. Goodrich Company of Akron, Ohio, U.S.A. Hycar 1300x8 and Hycar 1300x9. Hycar 1300x8 is described by its manufacturer as having a functionality of 1.8, an acrylonitrile content of 18% by weight and a Brookfield viscosity of 27° C. of 150,000. Hycar 1300x9 is recited by its manufacturer as having a functionality of 2.3, an acrylonitrile content of 18% by weight a Brookfield viscosity at 27° C. of 160,000.

As indicated above, the CTBN ingredient is used in amounts generally ranging from about 5 to about 25 phr. If less than about 5 parts by weight is utilized, the tear strength increasing ability is reduced. If more than about 25 parts by weight is utilized, there is further modulus and tensile loss. Since the CTBN ingredient is normally a liquid, it readily blends with the other ingredients.

The reinforcing filler typically is selected from the group consisting of carbon blacks, clays, minerals such as talc, and silica and very preferably is carbon black utilized in an amount ranging from about 30 to about 75 phr. When silica is used rather than carbon black, it preferably is utilized in an amount ranging from about 30 to about 75 phr. Carbon black and silica can be used in combination; in such case, the amount of carbon black utilized normally ranges from about 30 to about 75 phr, and the amount of silica utilized normally ranges from about 5 to about 30 phr. Generally, the carbon black used is one or more of the commercially available blacks known as under their ASTM designations as N-110, N-220, N-339, N-330, N-550 and N-660 grade carbon black (ASTM D-1765-B22).

Turning now to the curing system, it preferably is an accelerated sulfur curing system comprising from about 0.5 to about 7 phr sulfur and from about 0.5 to about 2.5 phr accelerator. The amount of sulfur utilized is related to the article being produced. For tank track pads, a low sulfur system (about 0.5 to about 1.5 phr) is preferred since this produces lower running temperatures. For belt skims, a high sulfur system (about 2 to about 7 phr) is preferred since this produces an article with good adhesion to steel. Very preferably it comprises from about 0.5 to 1.5 phr, accelerator. A preferred accelerator is sold under the name Amax by Vanderbilt Chemicals and is N-oxydiethylene-2-benzothiazole-sulfenamide. Other accelerators include, for example tetramethylthiuram disulfide, mercaptobenzothiazole, and cadmium, zinc or tellurium diethylthiocarbamate. Such curing systems are well-known in the art; see for example, the Vanderbilt Rubber Handbook, especially pages 337 to 406 and 464-485, edited by Robert O. Babbit, RT Vanderbilt Co. Inc. Norwalk, CT, USA (1978).

The curing system may also include zinc stearate as a promoter to reduce the time of curing. The zinc stearate is readily added in the form of zinc oxide (e.g. from about 5 to about 15 phr) plus stearic acid (e.g. from about 1 to about 5 phr) ingredients. While the rest of the curing system is ordinarily kept apart from the elastomer until just prior to curing, the stearic acid and zinc oxide can be included in a masterbatch of elastomer, CTBN, and reinforcing filler.

Cured products of this invention which include natural rubber as the only elastomer present can have, for example, a ring tear (test described hereinafter) at room temperature ranging from 900 to 1000 lbs./in. and at 212° F. ranging from about 450 to about 750 lbs./in. Inventive cured products including synthetic rubber in place of part of the natural rubber can have a ring tear at room temperature about that normally associated with 100% natural rubber elastomer product and substantially better ring tear than is normally associated with 100% natural rubber elastomer product at 212° F.

The advantages herein are readily obtained by substituting the CTBN additive for an equal weight of natural rubber in an existing formulation, e.g. such as that for tank track pads or belt skims.

The formulations herein are very suitable for production of tank track pads, belt skims and tire treads, e.g. truck and off-road tire treads.

Processing is readily carried out, for example, by adding all the elastomer into a mixer and mixing, then introducing the zinc stearate precursors and part of the reinforcing filler while continuing mixing, then adding the CTBN additive along with the rest of the reinforcing filler and mixing, for example, for 4 to 6 minutes to obtain a temperature of 300°-350° F., then dropping on a mill and adding curing system ingredients and processing on the mill for 4 to 6 minutes.

The invention is illustrated in the following specific examples which include the presently known best embodiment of the invention.

EXAMPLE I

Four compositions are formulated. The composition of Run 1 is not within the scope of the invention and contained no CTBN. The composition of Run 2 is within the scope of the invention and is similar to that of Run 1 except that 10 parts by weight CTBN (Hycar 1300x9) is used in place of 10 parts of the natural rubber. The composition of Run 3 is within the scope of the invention and has the same formulation as that of Run 1 except that 20 parts by weight CTBN (Hycar 1300x9) is used in place of 20 parts of the natural rubber. The composition of Run 4 is not within the scope of the invention and has the same formulation as that of Run 1 except that 10 parts by weight butadiene-acrylonitrile copolymer (sometimes referred to hereinafter as BN), namely Hycar 1312 obtained from Goodrich, is used in place of 10 parts of the natural rubber (the Hycar 1312 has the same molecular weight as the Hycar 1300x9 utilized in Runs 2 and 3 but has no carboxyl groups).

Processing for each run is carried out as follows: The elastomer, in this case the natural rubber, is added into a Banbury mixer and mixing initiated. After 1 minute, the zinc stearate precursors and one half the carbon black are introduced. After mixing for one more minute, the rest of the carbon black and any CTBN or BN is added. Mixing is then carried out for 5 minutes to obtain a temperature of 320° F. The resultant mix is dropped on a mill where the sulfur and accelerator (Amax) are added and processing on the mill is carried out for 5 minutes. Test specimens are cut from the resulting sheet and these tested as described below.

The formulations are made up using the following parts by weight of each ingredient. In the listing below, NR stands for natural rubber, CTBN for Hycar 1300x9, BN for Hycar 1312, CB for carbon black, and SA for stearic acid.

|  | Run 1 (100 NR/ No CTBN) | Run 2 (90 NR/ 10 CTBN) | Run 3 (80 NR/ 20 CTBN) | Run 4 (90 NR/ 10 BN) |
| --- | --- | --- | --- | --- |
| NR | 100 | 90 | 80 | 90 |
| CTBN | — | 10 | 20 | — |
| BN | — | — | — | 10 |
| CB | 40 | 40 | 40 | 40 |
| SA | 3 | 3 | 3 | 3 |
| ZnO | 10 | 10 | 10 | 10 |
| Amax | 1.2 | 1.2 | 1.2 | 1.2 |
| S | 2.0 | 2.0 | 2.0 | 2.0 |

Testing is carried out on samples made up from each of the formulations for tear strength in Ring Tear tests. The Ring Tear tests consisted of cutting ring shaped samples with outside diameter of 2.25 inches, width of about 0.25 inch and thickness of 0.100 inch, notching the rings with a razor blade and testing them by pulling on an Instron tester utilizing a jaw speed of 20 inches per minute. Testing was carried out at room temperature at at 212° F. (a constant temperature box was utilized to obtain the testing temperature). Each result is based on the average for four samples. Results are in lbs./inch with greater amounts indicating higher tear strengths.

Test results are as follows:

|  | Run 1 (100 NR/ No CTBN) | Run 2 (90 NR/ 10 CTBN) | Run 3 (80 NR/ 20 CTBN) | Run 4 (90 NR/ 10 BN) |
| --- | --- | --- | --- | --- |
| Ring Tear (room temp.) | 711 | 965 | 927 | 800 |
| Ring Tear | 312 | 500 | 703 | 364 |

-continued

| | Run 1 (100 NR/ No CTBN) | Run 2 (90 NR/ 10 CTBN) | Run 3 (80 NR/ 20 CTBN) | Run 4 (90 NR/ 10 BN) |
|---|---|---|---|---|
| (212° F.) | | | | |

The above results show that inclusion of the CTBN substantially improves tear strength of the cured rubber compound at room temperature and at 212° F. and does so significantly better than BN.

The uncured stock in Runs 2 and 3 has a lower viscosity than the control (Run 1) and processes facilily.

Similar results are obtained when silica is used in place of part or all of the carbon black or when other accelerators are used in place of Amax.

The formulations of Runs 2 and 3 can be modified to contain a high sulfur curing systems. These are useful in making belt skims and tire treads.

EXAMPLE II

Two compositions are formulated. The composition of Run 1 is the control. In Run 1 the elastomer is 35 parts by weight NR and 65 parts by weight styrene butadiene rubber (hereinafter SBR) and no CTBN is included. The composition of Run 2 is within the scope of the invention. In Run 2 the elastomer is 25 parts by weight NR and 65 parts by weight SBR, and 10 parts by weight CTBN was included.

Processing is carried out as in Example I.

The formulations are made up using the following parts by weight of each ingredient. In the listing below the same abbreviations are utilized as in Example I and SBR stands for styrene butadiene rubber. The CTBN ingredient utilized is Hycar 1300x9.

| | Run 1 (No CTBN) | Run 2 (10 Parts CTBN) |
|---|---|---|
| NR | 35 | 25 |
| SBR | 65 | 65 |
| CTBN | 0 | 10 |
| CB | 53 | 53 |
| SA | 1.7 | 1.7 |
| ZnO | 5 | 5 |
| Amax | 1.25 | 1.25 |
| S | 1.80 | 1.80 |

Testing is carried out on samples made up from each of the formulations, for the following: Tear Strength (Ring Tear test as described in Example I); Shore "A" Hardness (ASTM Testing Procedures D-1415 and D-2240); Running Temperature (ASTM Testing Procedure D-623); Compression Set (ASTM Testing Procedure D-395); Curability (Monsanto Rheometer −300° F.; ASTM Testing Procedure D-2084); 300% Modulus, Tensile and % Elongation (ASTM Testing Procedure D-412). The uncured stock is tested for Mooney Viscosity (ML$_4$) at 212° F. (ASTM Testing Procedure D-1646).

Test results are as follows:

| | Run 1 (No CTBN) | Run 2 (10 Parts CTBN) |
|---|---|---|
| Ring Tear (lbs./in.) | | |
| 73° F. | 648 | 695 |
| 212° F. | 337 | 457 |
| Shore "A" Hardness | | |
| 73° F. | 74 | 80 |
| 212° F. | 68 | 70 |
| Firestone Flexometer- 250 lb. Load | | |
| % Deflection | 11.3 | 7.3 |
| Running Temperature °F. | 329 | 371 |
| ML$_4$ at 212° F. | 87 | 73 |
| Monsanto Rheometer-300° F. | | |
| TS(2) - Minutes | 9.6 | 7.7 |
| TC(90) - Minutes | 21.8 | 21.9 |
| Compression Set-22 hrs. at 158° F. | | |
| % | 14.7 | 33 |
| Ring Stress-Strain- 30 min. at 300° F. | | |
| 300 Modulus (lbs./sq. in.) | 2597 | 1889 |
| Tensile (lbs./sq. in.) | 3642 | 3022 |
| % Elongation | 382 | 447 |

The above results show that the inclusion of the CTBN improves tear strength at room temperature and at 212° F., improves hardness at room temperature, and improves viscosity (thereby aiding processing) in the uncured stock. While the stock with CTBN cures a little faster (Monsanto Rheometer results), the small difference is not such as to cause problems. The above results show an increase in Compression Set and a decrease in 300% Modulus and Tensile properties but not to such degree as to eliminate utility.

While the foregoing example describe certain preferred embodiments of the intention, modifications will be readily apparent to those skilled in the art. Thus, the scope of the invention is intended to be defined only by the following claims.

What is claimed is:

1. A curable but uncured elastomeric composition, said composition comprising
    (a) 100 parts by weight polymer consisting of
        (i) from about 95 to about 25 parts by weight of natural rubber,
        (ii) from 0 to about 65 parts by weight of synthetic rubber,
        (iii) from about 5 to about 25 parts by weight of liquid carboxy-terminated butadiene-acrylonitrile copolymer having a functionality ranging from about 1.5 to about 2.5, an acrylonitrile content ranging from about 10% to about 40% by weight and a Brookfield viscosity at 27° C. ranging from about 50,000 to about 200,000 centipoise,
    (b) from about 30 to about 120 parts by weight of reinforcing filler.

2. The composition of claim 1, wherein no synthetic rubber is present.

3. The composition of claim 1, wherein the carboxy-terminated butadiene-acrylonitrile copolymer has an acrylonitrile content ranging from about 15% to about 25% by weight and Brookfield viscosity at 27° C. ranging from about 125,000 to about 175,000 centipoise.

4. The composition of claim 3, wherein the reinforcing filler is selected from the group consisting of carbon black and silica.

5. The composition of claim 4, wherein the reinforcing filler is carbon black used in an amount ranging from about 30 to about 75 parts by weight.

6. The composition of claim 1, wherein the synthetic rubber is styrene-butadiene rubber and is present in an amount ranging from about 45 to about 65 parts by weight.

7. A cured elastomeric composition of improved tear strength, said composition comprising
(a) 100 parts by weight polymer consisting of
  (i) from about 95 to about 25 parts by weight of natural rubber,
  (ii) from 0 to about 65 parts by weight of synthetic rubber,
  (iii) from about 5 to about 25 parts by weight of carboxy-terminated butadiene-acrylonitrile copolymer having a functionality ranging from about 1.5 to about 2.5, an acrylonitrile content ranging from about 10% to about 40% by weight and a Brookfield viscosity at 27° C. ranging from about 50,000 to about 200,000 centipoise,
(b) from about 30 to about 120 parts by weight of reinforcing filler, and
(c) a curing system.

8. The cured composition of claim 7, wherein the reinforcing filler is selected from the group consisting of carbon black and silica.

9. The cured composition of claim 8, wherein the reinforcing filler is carbon black used in an amount ranging from about 30 to about 75 parts by weight.

10. The cured composition of claim 9, wherein the carboxy-terminated butadiene-acrylonitrile copolymer has an acrylonitrile content ranging from about 15% to about 25% by weight and a Brookfield viscosity at 27° C. ranging from about 125,000 to about 175,000 centipoise.

11. The cured composition of claim 10, wherein the curing system is an accelerated sulfur system comprising from about 0.5 to about 7 parts by weight sulfur and from about 0.5 to about 2.5 parts by weight accelertor.

12. The cured composition of claim 11, wherein no synthetic rubber is present.

13. The cured composition of claim 11, wherein the synthetic rubber is styrene-butadiene rubber and is present in an amount ranging from about 45 to about 65 parts by weight.

* * * * *